United States Patent [19]

Pecora

[11] 4,377,878

[45] Mar. 29, 1983

[54] VEHICLE FINISHING DEVICE

[76] Inventor: Daniel P. Pecora, 456 Kensington Court, Palatine, Ill. 60067

[21] Appl. No.: 233,511

[22] Filed: Feb. 11, 1981

[51] Int. Cl.³ .............................................. B60S 3/06
[52] U.S. Cl. ............................... 15/97 B; 15/DIG. 2; 15/230.16; 51/334
[58] Field of Search ................ 15/97 B, 53 A, 53 AB, 15/DIG. 2, 183, 230, 230.16, 230.14; 51/334

[56] References Cited

U.S. PATENT DOCUMENTS

| 2,754,531 | 7/1956 | Rowland | 15/183 |
| 3,761,986 | 10/1973 | Rickel | 15/53 AB |
| 3,774,259 | 11/1973 | Genaro | 15/97 B |
| 4,018,014 | 4/1977 | Belanger | 15/230.14 |
| 4,104,756 | 8/1978 | Gasser | 15/97 B |

Primary Examiner—Edward L. Roberts
Attorney, Agent, or Firm—Hume, Clement, Brinks, Willian & Olds, Ltd.

[57] ABSTRACT

An improved vehicle finishing device is disclosed for a rotary vehicle finishing apparatus. The device includes a plurality of finishing units, each of which is mounted on a drum and has a continuous base portion and a plurality of elongated flexible finishing elements. A plurality of stiffeners are also mounted on respective mounting sites on the drum. The base portions of the finishing units bear against the stiffeners when the apparatus is rotated and biased against a vehicle. The stiffeners support the base portions of the finishing units, thereby preventing the finishing elements from collapsing against the drum.

15 Claims, 8 Drawing Figures

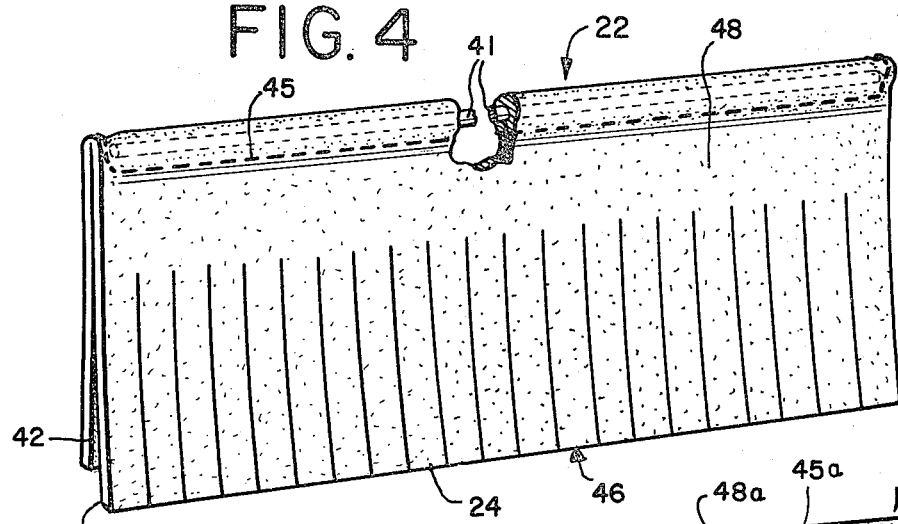
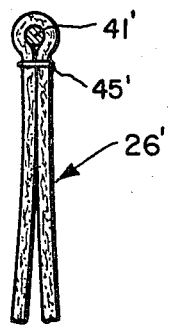
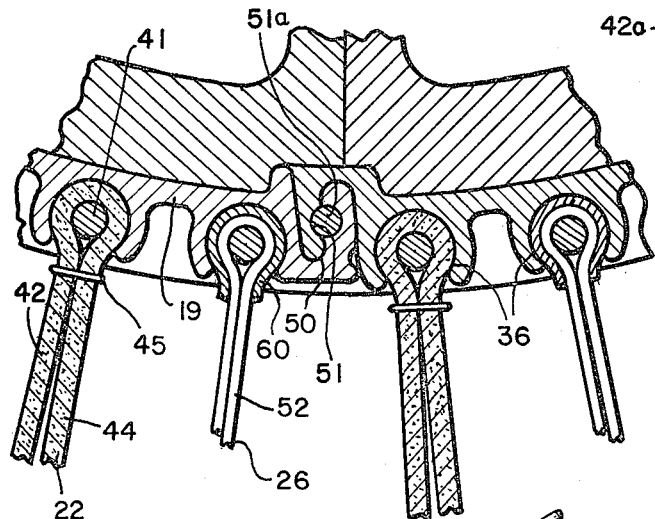
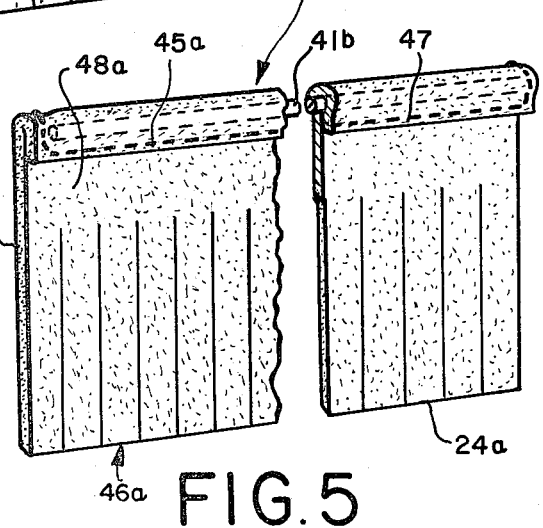
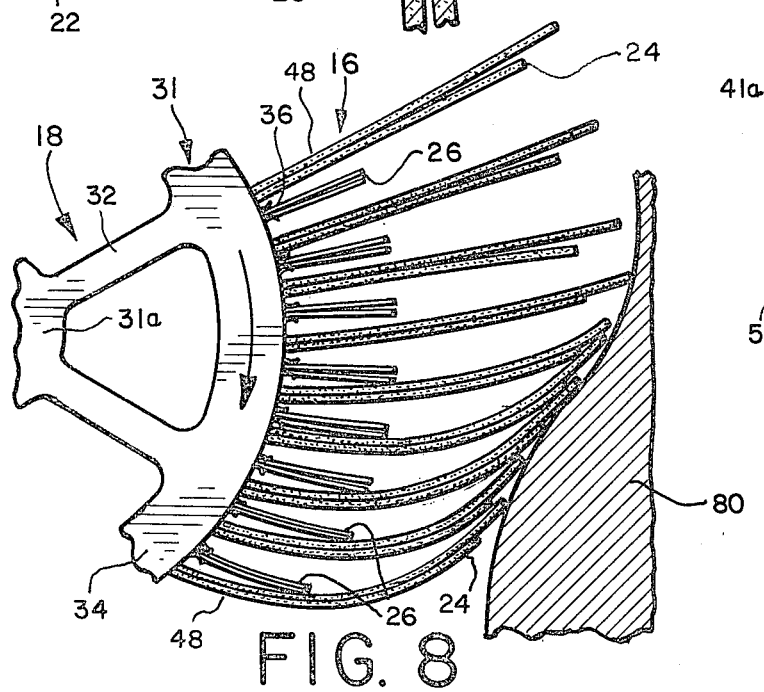

VEHICLE FINISHING DEVICE

BACKGROUND OF THE INVENTION

This invention relates to an improved vehicle finishing apparatus and more particularly to an improved finishing device which includes an improved, efficient means for preventing flexible finishing elements on the finishing device from collapsing against the drum to which the finishing elements are attached.

Finishing devices such as car finishing brushes and polishing or buffing devices have in the past been used in automatic car and truck finishing machinery of the type wherein remotely or automatically controlled equipment is used to wash, dry, wax, polish, or buff the surface of the vehicle. Conventionally, these finishing devices include a drum which is biased towards the vehicle by a spring, hydraulic, pneumatic, or gravity operated system. A motor turns the drum which causes the finishing elements on the drum to wash, dry, polish, or otherwise finish the vehicle's surface.

Such finishing devices have in the past been made from a number of materials. One example of a prior art finishing device is a car washing brush which has elongated, flexible plastic filaments alternating with shorter adjacent plastic filaments. This brush, however, has several disadvantages. Chief among those disadvantages is that the shorter filaments do not provide optimal support to the elongated filaments when the brush is rotated and biased against a car. In this situation the elongated filaments are deflected towards the shorter filaments. Because both sets of filaments are relatively narrow in effective width, it is possible for the shorter filaments to become interwoven with the elongated filaments. In extreme cases, the shorter filaments can protrude through the elongated filaments and can come into direct contact with the car being washed. Furthermore, since neither the elongated filaments nor the shorter filaments are secured together except at the surface of the drum, any stiffening forces supplied by the shorter filaments to the elongated filaments are not transmitted efficiently along the length of the drum. This prior art brush is therefore subject to localized collapse of the elongated filaments against the drum.

SUMMARY OF THE INVENTION

The present invention is directed to an improved vehicle finishing device which to a large extent overcomes these and other disadvantages of the prior art.

According to this invention, a vehicle finishing apparatus of the type which comprises a drum, means for rotating the drum, and means for biasing the drum against a surface of a vehicle is provided with an improved finishing device. This improved device comprises a plurality of finishing units, each of which is mounted on the drum. Each finishing unit has a continuous phase portion and a plurality of elongated, flexible finishing elements. This improved finishing device also includes a plurality of stiffeners, each of which is mounted to the drum such that the stiffeners support the finishing units along their continuous base portions while leaving the finishing elements free to flex against a vehicle. The stiffeners act substantially to prevent the finishing elements of the finishing units from collapsing against the drum by bearing against the continuous base portion when the finishing device is rotated and the finishing elements are engaged against the surface of a vehicle.

Preferably, the finishing elements are made from a cloth such as felt, but other flexible materials including cloths other than felt may be used in the finishing elements of this invention. In the preferred embodiment, the stiffeners can comprise a cloth such as felt of suitable stiffness. Plastic filaments substantially shorter than the finishing elements also work well.

One of the important advantages of this invention is that the stiffeners act to provide a change in the flexibility of the finishing units at the points corresponding to the ends of the stiffeners. This causes the base portions of the finishing units to tend to flex at the end of the stiffeners. Because the base portions are continuous, stiffening forces applied to any one portion of a finishing unit are in part transmitted to adjacent portions of the finishing unit. In this way localized collapse of the finishing elements against the drum is largely prevented. In addition, because the base portions of the finishing units are continuous, the stiffeners are substantially prevented from becoming interwoven with the finishing units, and the stiffeners are therefore prevented from coming into contact with the vehicle.

The structure of the finishing device of this invention tends to prevent the finishing elements from collapsing against or wrapping around the drum, and thereby keeps the drum and the stiffeners from approaching the vehicle too closely. In order to achieve this end, the stiffeners should be chosen to provide adequate stiffness for the particular biasing mechanism used. This results in less buffeting and rocking of the vehicle, less vehicle damage, and better contact between the tips of the finishing elements and the surface of the vehicle, which enhances the finishing, washing, or polishing effect of the finishing elements.

The invention, together with further objects and advantages, will be best understood by reference to the following detailed description when taken in conjunction with the accompanying drawings.

BRIEF DESCRIPTION OF THE DRAWINGS

FIG. 3 is a sectional view taken along line 3—3 of FIG. 1.

FIG. 4 is a perspective view of one of the two-ply finishing units of the embodiment of FIG. 1.

FIG. 5 is a perspective view of an alternate embodiment of the finishing unit of FIG. 4.

FIG. 6 is a perspective view in partial cutaway of one of the stiffeners of the embodiment of FIG. 1.

FIG. 7 is a sectional view of an alternate embodiment of the stiffener of FIG. 6.

FIG. 8 is a sectional view corresponding to FIG. 2 showing the improved vehicle finishing device of FIG. 1 in operation on a vehicle.

DETAILED DESCRIPTION OF THE PREFERRED EMBODIMENTS

Figure 1:
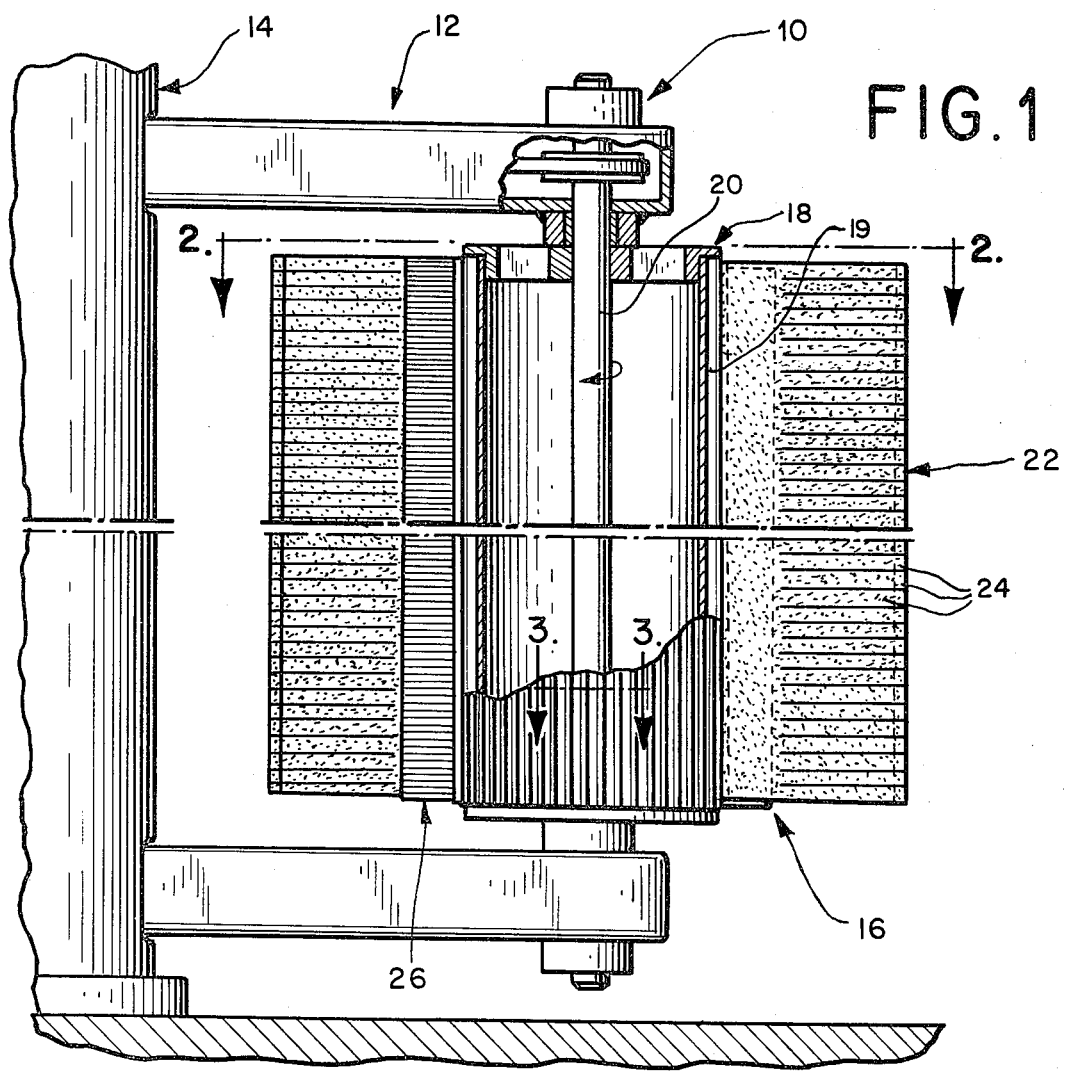
FIG. 1 is a side elevational view in partial cutaway of a preferred embodiment of the improved vehicle finishing device of this invention as installed in a vehicle finishing apparatus.

Turning now to the drawings, FIG. 1 illustrates a vehicle finishing apparatus, generally designated by the reference numeral 10. The apparatus 10 includes an mechanism 12 for biasing an improved vehicle finishing device 16 against a vehicle (not shown), and a drive mechanism 14 which turns an axle 20, thereby rotating the device 16. The improved finishing device 16 of FIG. 1 includes a drum 18, a plurality of finishing units 22, and a plurality of stiffeners 26. Each of these parts of the device 16 will be described in greater detail below. The biasing mechanism 12, the axle 20, and the drive mechanism 14 are conventional articles of commerce known to those skilled in the art, and they do not, per se, form a part of the present invention. Accordingly they will not be described in detail here.

The device 16 of FIG. 1 includes a plurality of finishing units 22, one of which is shown in perspective view in FIG. 4. Preferably, each finishing unit 22 includes a shaft 41 and two plies 42,44 of a cloth material such as felt. As used herein, cloth is used in its broadest sense so as to include both woven and non-woven materials, made of either natural or manmade fibers. Each finishing unit 22 is made by taking a single piece of cloth and wrapping it around the shaft 41 to form two plies 42,44. These plies 42,44 are then secured together near the shaft 41 by means of stitching 45 or alternate methods such as stapling. The two plies of cloth 42,44 are slit substantially along their widths from their free edges 46 toward the shaft 41 to provide a plurality of elongated, flexible finishing elements 24 which are joined to a continuous base portion 48. The length of the finishing elements 24 can be varied, of course, to suit the particular application for which the finishing elements 24 is intended.

In one preferred embodiment of the finishing units 22, the width of material before assembly of the finishing unit 22 is about 33 inches, and its length (measured parallel to the shaft 41) is somewhat longer than the shaft 41. After wrapping the cloth around the shaft 41 and stitching the two plies 42,44 together, this material yields plies of approximately 16 and 17 inches, respectively, measured from the shaft 41 to their free edges 46. In this embodiment, the finishing elements 24 are preferably 10 and 11 inches in length respectively, leaving a continuous base portion 48 of approximately 6 inches. This continuous base portion 48 helps keep the finishing elements 24 oriented outwardly when the finishing unit 22 is mounted on the drum 18, as shown in FIG. 1. It also transmits stiffening forces along the length of the finishing unit 22, as explained in the discussion below of FIG. 8. Referring again to FIG. 4, each of the finishing elements 24 can be, for example, one-half inch wide. The presently preferred range of widths of the finishing elements 24 extends from about one-fourth inch to about two inches. Alternately, additional pieces of material may be sewn along the continuous base portion 48 to provide extra plies of cloth (not shown) for applications requiring increased numbers of finishing elements 24. Alternatively, finishing elements 24 can be attached separately to the continuous base portion 48 by means of stitching, instead of starting with one piece of cloth.

Preferably, non-woven polyester felt having a woven substrate or scrim should be used. The preferred thickness of the felt is 0.080-0.120 inch, and either an acrylic or acrylonitrile binder for the felt may be suitable. Of course, many different types of felt as well as other flexible cloths may be suitable for use in the present invention, it addition to or instead of the felt described above.

FIG. 5 shows an alternate embodiment of the finishing unit 22a having a single ply of cloth. This embodiment is useful, for example, where only light duty finishing is necessary. The starting piece of material in this instance is preferably about eighteen inches wide, and somewhat longer than the shaft 41b. The shaft 41b is generally the same type used in the two-ply finishing unit 22 described above. The upper end 47 of the material is wrapped around the shaft 41b and is fastened by means of stitching 45a along the base portion 48a of the felt ply 42a. Again, the ply 42a is cut from the free edge 46a toward the upper end 47 to provide a large number of finishing elements 24a and a continuous base portion 48a.

Figure 2:
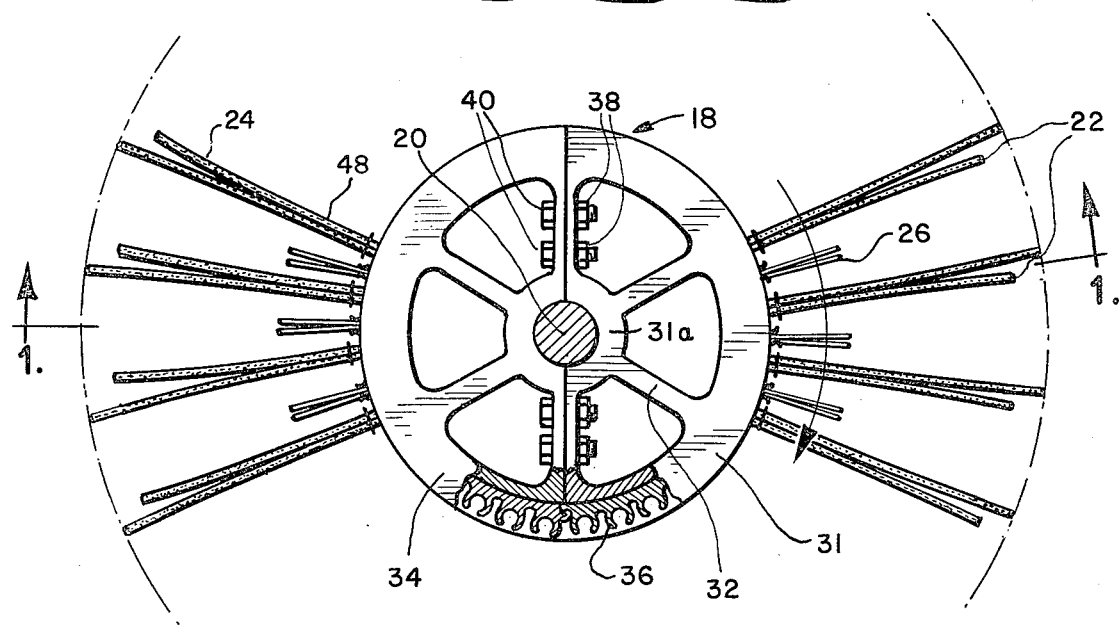
FIG. 2 is a sectional view taken along line 2—2 of FIG. 1 in partial cutaway.

FIG. 6 shows a first preferred embodiment of one of the stiffeners 26, which is also included in the device 16 of FIG. 1. Each stiffener 26 includes a plurality of filaments 52, a shaft 41a and a clamp 60 to hold the filaments 52 in place. The stiffeners 26 may be made by wrapping filaments 52 more than twice as long as the size of the desired final stiffeners 26, measured from the shaft 41a to the end of the filament 52, around the shaft 41a and holding the filaments in position with the clamp 60. This clamp 60 may be, for example, a sheet of soft metal crimped around the shaft 41a. Once in place around the shaft 41a, the clamp 60 should have a final diameter such that the stiffener 26 will fit snugly in a mounting site 36 on the drum 18, as shown in FIGS. 2 and 3. The stiffener 26 may range in size, depending upon the length of the finishing element 24 used. Generally, the stiffener 26 should not extend beyond the continuous base portion 48 of the finishing unit 22, as shown in FIG. 2. The preferred range of stiffener 26 sizes runs between 20-70 percent of the distance from the shaft 41 to the free edge 46 of the finishing element 24.

Referring again to FIG. 6, the filaments 52 are preferably made from low density polyethylene filament, although many other types of filament, both natural and man-made, may be suitable for use as stiffeners 26 in the present invention. If low-density polyethylene filament is used, it is preferable that the filament have an x-shaped cross-section, and that it be extruded and oriented to increase the filament's stiffness. The filaments 52, when left unfinished, have in the past shown evidence of their effectiveness in supporting the base portion 48 of the finishing unit 22 by eventually wearing through the base portion 48 of the finishing unit 22. The tips of the filaments 52 should therefore be flagged with a conventional flagging machine in order to give the filaments 52 a softer tip. This lessens wear on the cloth, and thereby extends the life of the continuous base portion 48 of the finishing unit 22.

FIG. 7 illustrates a second preferred embodiment of a stiffener 26'. This stiffener 26' can be made from the same material as the finishing elements 24. For example, a piece of felt slightly longer than twice the desired width of the stiffener 26' is wrapped around a shaft 41' of the same diameter as used in fabrication of the finishing units 22. The plies of felt are preferably held in place by means of stitching 45'. The felt used in the stiffeners 26', however, remains unslit to maximize its stiffness, and when mounted on the drum 18 extends radially a distance of about one-third as far as the maximum radial extension of the finishing elements 24, as shown in FIG. 2. Of course, other cloths may be used to make the stiffeners 26, and in each case lengths and thicknesses should be selected so that they will prevent the finishing elements 24 from collapsing against the drum 18 when the apparatus 10 is in operation.

Construction of the drum 18 may be understood by reference to FIGS. 1, 2, and 3. Turning first to FIG. 2, the drum 18 includes four identical semi-circular end pieces 31. These end pieces 31 retain the sides 19 of the drum 18 shown in FIG. 1. Each semi-circular end piece 31 includes a hub 31a, spokes 32, and a rim 34. Each end piece 31 is preferably made from painted or corrosion resistant metal. The hub 31a is designed to grip the axle 20 securely. The spokes 32 connect the hub 31a to the rim 34. The sides 19 of the drum 18 are shown in FIGS. 1 and 3. The sides 19 of the drum 18 include a number of mounting sites, such as the elongated mounting channels 36, each adapted to grip either one of the finishing units 22 or one of the stiffeners 26 securely. As shown in FIG. 3, the sides 19 of the drum 18 are fitted together at their interlocking edges 50. The two interlocking edges 50 are designed to define an aperture 51 when the two interlocking edges 50 are fitted together. A pin 51a is driven into the aperture 51 formed by the interlocking edges 50 to hold the interlocking edges 50 together securely. The sides 19 of the drum 18 are preferably made from aluminum, but other lightweight and rust resistant materials may be used. As shown in FIG. 2, the two halves of the mounting pieces 31 on the top and bottom of the drum 18 are bolted together using nuts 38 and bolts 40. The rim 34 prevents the finishing units 22 and the stiffeners 26 from sliding out of their channels 36.

The improved vehicle finishing device 16 is assembled by inserting assembled finishing units 22 and stiffeners 26 into the channels or mounting sites 36 on the periphery of the drum 18, as shown in FIG. 3. The pieces of the drum 18 are installed around the axle 20 which is usually in place in the finishing apparatus 10. Two of the mounting pieces 31 are fitted in place near the bottom of the axle 20 and bolted together around the axle 20 as shown in FIG. 1. The sides of the drum 18 are fitted into place and fastened together using conventional fasteners (not shown). The other two mounting pieces 31 are then fitted into place near the top of the axle 20 and bolted around the axle 20 and over the drum 18. Of course, this description outlines only one preferred way of assembly, and variations in assembly can be made. For example, the improved vehicle finishing device 16 can be assembled around the axle 20, and then the axle 20 can be installed into the apparatus 10.

Also, the stiffeners 26 can be placed within the finishing units 22. Further, the placement of stiffeners 26 and finishing units 22 may be varied. They may be alternated around the periphery of the drum 18 as shown in FIG. 2. There may also be other proportions used, for example, such as two, three, or more finishing units 22 for every stiffener 26 or vice versa, so long as a minimum amount of stiffness is maintained to prevent collapse of the finishing elements 24 against the drum 18 for the particular application.

FIG. 8 shows the improved vehicle finishing device 16 in operation. As the drum 18 turns, the finishing elements 24 are moved outward by centrifugal force. When the finishing elements 24 come into contact with a surface of a vehicle 80, the resistance of that surface flexes the finishing elements 24. The stiffeners 26 resist against the continuous base portion 48 of the finishing units 22 allowing the finishing elements 24 partially to flex, but substantially preventing the finishing elements 24 from collapsing against the drum 18 when the drum 18 is rotated and biased against the surface of a vehicle 80.

An important advantage of this invention, illustrated by FIG. 8, is that the ends of the stiffeners 26 support the flexing finishing elements 24. This causes the finishing elements 24 preferentially to bend around the end of the stiffeners 26, thereby avoiding collapse of the finishing elements 24 around the drum 18. The continuous base portion 48 of this embodiment effectively eliminates the interweaving and localized collapse problems of the prior art. Also, the surface of the vehicle 80 is protected from the stiffeners 26 which protects the vehicle's finish.

A second feature of this preferred embodiment is that the properties of the stiffeners 26 used may be varied according to the type of biasing apparatus 12 used. The stiffener 26 should be chosen to prevent collapse of the finishing elements 24 against the drum 18 for the type of biasing means 12 used.

Another feature of this preferred embodiment is that the widths of the stiffeners 26 and widths of the finishing units 22 may be varied to increase stiffness, or to maximize contact between the edges 46 of the finishing elements 24 and the surface of the vehicle 80. Flexibility may be thus adjusted by adjusting the length and width of the stiffener 26, the length and width of the continuous base portion 48, and the length of the finishing element 24. So long as a minimum amount of stiffness is preserved to substantially prevent collapse of the finishing elements 24 against the drum 18, the dimensions and stiffness of components can be varied to obtain maximum finishing capabilities for each individual application. In addition, the drum 18 of this preferred embodiment is designed to be modular to facilitate replacement of stiffeners 26 and finishing elements 24 where necessary.

It should be understood that various modifications of the embodiments disclosed in this detailed description will be apparent to those skilled in the art. For example, the stiffeners 26 can be included within the finishing units 22 and rigid alternation of finishing units 22 and stiffeners 26 is not required. In addition, the continuous base portion can extend over only a fraction of the entire length of the finishing unit along the surface of the drum. The foregoing description is provided to enable one skilled in the art to make and use the presently preferred embodiment of the invention and should not be construed as limiting the scope of the invention. Rather, it is intended that the scope of this invention be defined by the following claims, including all equivalents.

I claim:

1. In a rotary vehicle finishing apparatus comprising a drum, means for rotating a drum, and means for biasing the drum against a vehicle, the improvement comprising:

a plurality of finishing units, each finishing unit being mounted on the drum, and each finishing unit including a continuous base portion and a plurality of elongated, flexible finishing elements secured to and extending radially from the base portion; and, a plurality of stiffeners, each stiffener being mounted on the drum, and each stiffener extending radially away from the drum by an amount substantially no greater than the radial extent of the base portions, such that the stiffeners support the continuous base portions of the finishing units, thereby substantially preventing the finishing elements from collapsing against the drum when the drum is rotated and the drum is biased toward a vehicle, the finishing units and the stiffeners cooperating to substantially prevent the stiffeners from protruding between adjacent finishing elements and coming into contact with the vehicle.

2. The invention of claim 1 wherein said finishing elements comprise cloth.

3. The invention of claim 1 wherein said finishing elements comprise felt.

4. The invention of claim 1 wherein each of said stiffeners is positioned between two adjacent finishing units such that the finishing units and the stiffeners alternate around the periphery of the drum.

5. The invention of claim 1 wherein each of the stiffeners comprises a plurality of filaments.

6. The invention of claim 1 wherein each of said stiffeners comprises two plies of a continuous stiff cloth.

7. In a rotary vehicle finishing apparatus comprising a drum which includes a plurality of mounting sites, means for rotating the drum, and means for biasing the drum against a vehicle, the improvement comprising:

a plurality of finishing units, each finishing unit being mounted on a respective mounting site on the drum and each finishing unit comprising at least one ply of cloth such that each of the finishing units defines a continuous base portion adjacent to the drum and a plurality of elongated, flexible cloth finishing elements secured to and extending away from the respective continuous base portion; and a plurality of stiffeners, each stiffener being mounted on a respective mounting site on the drum and each stiffener extending radially by an amount substantially no greater than the radial extent of the base portions of the finishing units such that the stiffeners are positioned to bear against the continuous base portions of the finishing units, thereby substantially preventing the finishing elements from collapsing against the drum when the drum is rotated and the drum is biased toward the vehicle, the finishing units and the stiffeners cooperating to substantially prevent the stiffeners from protruding between adjacent finishing elements and coming into contact with the vehicle.

8. The invention of claim 7 wherein each of the stiffeners comprises a plurality of closely spaced plastic filaments flagged at their tips.

9. The invention of claim 7 wherein each of said stiffeners comprises two plies of continuous felt.

10. The invention of claim 7 wherein each of said finishing units comprises two plies of felt slit across a portion of their widths from one end toward the continuous base portion to form the plurality of finishing elements.

11. The invention of claim 7 wherein each of said stiffeners is positioned between two adjacent finishing units such that the finishing units and the stiffeners alternate around the periphery of the drum.

12. The invention of claim 7 wherein the base portion of each of said finishing units extends radially from the drum approximately one-third the radial extent of said finishing units.

13. In combination with a vehicle finishing apparatus comprising a vehicle finishing device, means for rotating the device, and means for biasing the device toward the vehicle, an improved vehicle finishing device comprising:

a drum which defines a plurality of mounting sites;

a plurality of finishing units, each finishing unit mounted on a respective mounting site on the drum, each finishing unit comprising two plies of felt slit across a portion of their widths to define a continuous base portion and a plurality of elongated, flexible finishing elements secured to and extending from the base portion; and a plurality of stiffeners, each stiffener extending radially from the drum approximately as far as the continuous base portion of the finishing unit, each of the plurality of stiffeners being mounted on the drum between two adjacent finishing units such that the finishing units and stiffeners alternate around the periphery of the drum and the stiffeners support the finishing elements, thereby substantially preventing the finishing elements from collapsing against the drum when the drum is rotated and the drum is biased toward the vehicle, the finishing units and the stiffeners cooperating to substantially prevent the stiffeners from protruding between adjacent finishing elements and coming into contact with the vehicle.

14. The invention of claim 13 wherein each of said stiffeners comprises a plurality of closely spaced plastic filaments flagged at their tips.

15. The invention of claim 13 w'erein each of said stiffeners comprises two plies of continuous felt.

* * * * *